July 12, 1938.   J. R. MAHAN   2,123,679
COUNTERBALANCE DEVICE
Filed July 21, 1937
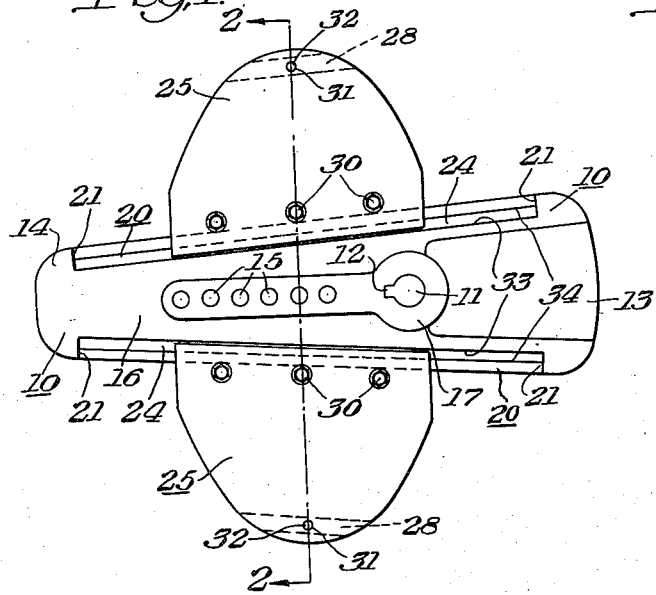
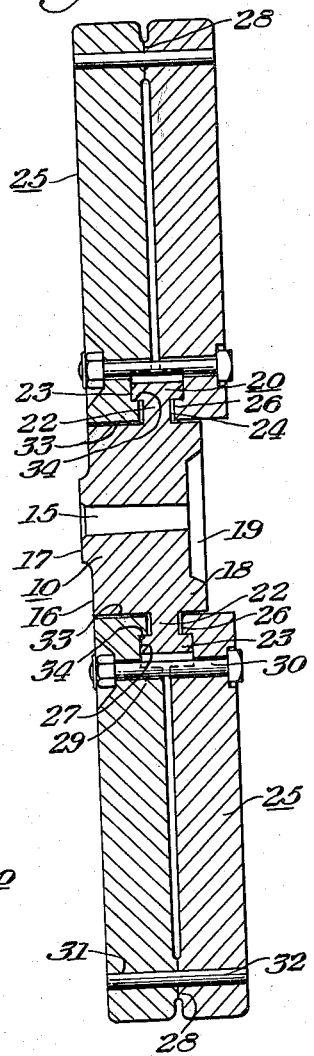
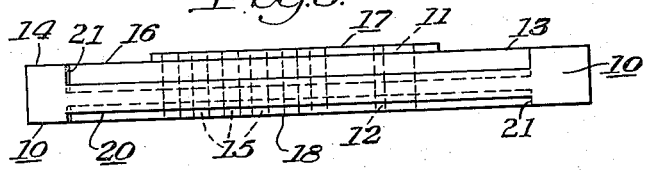
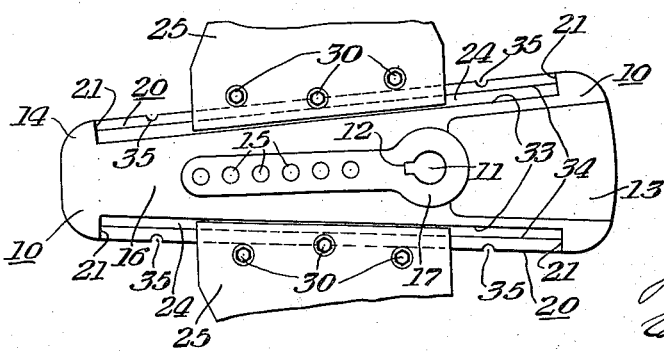
INVENTOR
Joseph R. Mahan,
BY Edward A. Laurence
his ATTORNEY Patented July 12, 1938

2,123,679

UNITED STATES PATENT OFFICE 2,123,679

COUNTERBALANCE DEVICE

Joseph R. Mahan, Toledo, Ohio, assignor to The National Supply Company, Pittsburgh, Pa., a corporation of Pennsylvania Application July 21, 1937, Serial No. 154,735

1 Claim. (Cl. 74—593)

This invention relates generally to counterbalance devices for crank shafts in oil well drilling and pumping apparatus and more particularly to improvements in the counterbalance weight structure for radial crank arms.

The principal object of this invention is the provision of a two-part counterweight structure for a radial crank arm adapted to be secured on the ends of a crank shaft of oil well drilling and pumping apparatus.

Another object is the provision of a two-part counterweight which is readily adaptable to and adjustable on a radial crank arm.

Other objects appear in the following description.

In the accompanying drawing wherein a practical embodiment of the principles of this invention is illustrated:

Fig. 1 is a side elevation of a radial crank arm showing the weights attached thereto.

Fig. 2 is an enlarged vertical section taken through the weights and the crank arm along the line 2—2 in Fig. 1.

Fig. 3 is an edge view of the crank arm with the weights removed.

Fig. 4 is a view similar to Fig. 1 but showing a modification.

Referring first to Figs. 1, 2 and 3 of the drawing, 10 represents a radial crank arm which is preferably wedge-shaped, as illustrated in Fig. 1. 11 represents a transverse opening in the longitudinal axis of the crank arm for receiving the end of a crank shaft and which is provided with a keyway 12 for securing the crank arm to said shaft. The center of the opening 11 is preferably positioned approximately one-third the distance of the length of the wedge-shaped crank arm from the large end thereof, thus providing a short arm 13 and a long arm 14 in diametric alignment on opposite sides of the shaft.

15 represents a series of transverse holes along the longitudinal axis of the long arm 14 for the insertion of a wrist pin to which a pitman or other connecting rod means may be attached for deriving reciprocating motion from the rotary crank shaft. The front or outer face 16 of the crank arm is provided with a raised surface or boss 17 which includes the shaft opening 11 and the wrist pin holes 15, thus preventing any interference between the pitman or rod arm structure with the crank arm. The rear or inner face 18 of the crank arm 10 may be hollowed out along the wrist pin openings 15 as indicated at 19 to provide space for securing the wrist pin to the crank arm without interference with the crank shaft supporting and driving mechanism.

The sides of the crank arm are so cast as to provide the T-shaped rails 20 which extend longitudinally thereof, forming a portion of the short and long arms 13 and 14, and terminate at the shoulders 21 adjacent the ends of the crank arm. It will be noted from Figs. 2 and 3 that the longitudinal axis of the rails 20 are nearer the rear face 18 than they are to the front face 16 of the crank arm. 22 represents the web and 23 represents the head of the T-shaped rail sections which form, with the body of the crank, the grooves 24.

25 represents the counterbalance weights which are preferably made up of two sections of substantially the same character and size. The general contour and mass of these weights may be designed to conform with the particular application for which they are intended.

One end of each weight part is provided with an inturned flange 26 arranged to extend into the groove 24. The radial surface of the flange is arranged to be spaced from the radial surface of the web 22 of the T-shaped rail 20. These inturned flanges form the grooves 27 with the body of the weight parts for receiving and engaging the radial surfaces of the head portions 23 of the rail 20, as shown in Fig. 2. It is preferable to provide a small clearance between the radial surface of the flanges 26 and the radial surfaces of the webs of the rails to permit the total weight clamping force to be applied through the radial faces of the grooves 27 and the heads of the rails.

The adjacent faces of the weight parts are substantially parallel and are held in spaced relation at the inner end by the thickness of the heads 20 of the rails and adjacent the outer end by a boss 28 on each weight part which extends parallel to the flange 26.

The complementary weight parts are provided with transverse aligned holes 29 adjacent the groove 27 for receiving the bolts 30 which aid in holding the weight parts together when loosened and when tightened clamp them snugly to the T-shaped rails 20 at any desired position therealong. When in position the stems of the bolts 30 are adequately spaced from the top of the rail head 23 as illustrated in Fig. 2 to prevent interference.

31 represents transverse aligned holes in the outer ends of the weights for receiving a pin or bolt 32 for holding the weight parts together with the surfaces of the bosses 28 in contact relation. It is preferable that these aligned holes pass through the bosses 28 in the weight parts to prevent the bolts having any effect upon the spreading or clamping of the flanges 26.

Since the longitudinal axis of the rails 20 are closer to the rear face 18 of the crank arm a heavy weight such as shown in Fig. 2 may be attached thereto and the front face of the weight may extend to substantially the same plane as the front face 16 of the crank arm without interfering with the pitman or rod connection attached thereto.

When the weight parts are assembled together and on the crank arm they are supported by the axial surfaces 33 or 34 of the groove 24 and their complementary surfaces on the flange 26, depending upon the position of the crank. Thus in Fig. 2 the loose weight parts on the upper side of the crank arm may ride along the surface 33 while the weights on the lower side ride on the surface 34 or the inner surface of the T-head 23. Small clearances may be employed between the flange 26 and the side walls 33 and 34 of the groove 24 to provide easy adjustment of the weights therealong.

With the wedge-shaped crank arm the weights may be designed to provide a maximum counterbalance effect when secured at their extreme position on the long arm 14 and a balanced effect when the weights are at their extreme position on the short arm 13. If the sides of the crank arm were parallel or wedge-shaped in the opposite direction then the short arm of the crank would have to be longer than that illustrated in the drawing to make up for the lost mass in the wide short arm 13.

The centrifugal force of the weights represents the greatest force that must be contended with and this force is radial in direction from the axis of the crank shaft. Thus when using a wedge-shaped crank arm of the character shown the rails 20 will assume part of the load of this force and the balance of this load will be assumed by the frictional engagement between the end of the radial surfaces of the grooves 27 and the radial surfaces of the rail heads.

If the crank arm were wedge shaped in the opposite direction, that is, the sides of the long arm diverged rather than converged, then more of the centrifugal load would be carried by the frictional engagement and less by the T-head of the rails 20. The transference of the centrifugal force from one part of the crank arm to the other would vary in accordance with the position of the center of mass of the weight with respect to the radial axis from the center of rotation along which the center of mass is adjustable. Thus by changing these points of design the distribution of the load to definite parts of the structure may be controlled to the best advantage.

Referring now to Fig. 4, I have shown a modification wherein the intermediate bolt or bolts 30, which are used to clamp the weight parts together and to the crank arm, are so positioned as to engage transverse notches 35 in the heads of the rails. This engagement of the intermediate bolts and the crank arm provides additional means, other than that described above, for securing the weight parts to the crank arm and preventing their accidental movement longitudinally of the crank arm. It is understood that the weight parts may be first mounted on the crank arm by means of the end bolts 30 which are not tightened until the weights are adjusted and the intermediate bolts are applied.

I claim:—

In a counterbalance device for well pumping apparatus, the combination of a radial crank arm arranged for mounting on a rotary crank shaft, a rail along the upper and lower longitudinal edges of said crank arm, said rail having a head portion and a web portion, a two-part counterweight, a continuous inturned flange on each of said weight parts adjacent one edge thereof defining oppositely disposed grooves, said flanges and grooves of the weight parts forming a socket for receiving the head portion of the rail, means on said weight parts for holding them in assembled relation to permit their adjustment along said rail, and means for drawing the weight parts together to frictionally engage the bottom of said grooves with the sides of the head portion of the rail to fixedly clamp the weight in a selected position along the rail, said flanges remaining in spaced relation with said web portion of the rail.

JOSEPH R. MAHAN.